(12) United States Patent
Cui et al.

(10) Patent No.: US 7,962,186 B2
(45) Date of Patent: Jun. 14, 2011

(54) METHOD AND APPARATUS FOR TRANSFERRING ELECTRICAL POWER IN AN ELECTRONIC DEVICE

(75) Inventors: Wei Cui, Espoo (FI); Pei Li, Helsinki (FI)

(73) Assignee: Nokia Corporation, Espoo (FI)

( * ) Notice: Subject to any disclaimer, the term of this patent is extended or adjusted under 35 U.S.C. 154(b) by 886 days.

(21) Appl. No.: 11/977,724

(22) Filed: Oct. 24, 2007

(65) Prior Publication Data

US 2009/0111531 A1   Apr. 30, 2009

(51) Int. Cl.
*H04M 1/00* (2006.01)
*H04B 7/00* (2006.01)

(52) U.S. Cl. ............... 455/575.7; 455/575.4; 455/41.2; 455/552.1; 455/573

(58) Field of Classification Search .......... 455/41.1, 455/41.2, 575.4, 575.3, 575.7, 552.1, 553.1, 455/557, 573
See application file for complete search history.

(56) References Cited

U.S. PATENT DOCUMENTS

| | | | | |
|---|---|---|---|---|
| 5,987,311 A * | 11/1999 | Phillips | ........................ | 455/575.7 |
| 6,028,764 A * | 2/2000 | Richardson et al. | ...... | 361/679.29 |
| 6,384,587 B2 * | 5/2002 | Aizawa et al. | ................ | 323/355 |
| 6,804,536 B1 | 10/2004 | Bultman | ........................ | 455/557 |
| 6,960,968 B2 | 11/2005 | Odendaal et al. | ............. | 333/219 |
| 7,274,335 B2 * | 9/2007 | Kim et al. | ...................... | 343/702 |
| 7,403,743 B2 * | 7/2008 | Welch | ......................... | 455/41.1 |
| 2002/0058536 A1 * | 5/2002 | Horii et al. | ..................... | 455/566 |
| 2005/0026643 A1 * | 2/2005 | White et al. | ............... | 455/550.1 |
| 2005/0288073 A1 * | 12/2005 | Irie | ............................. | 455/575.3 |
| 2006/0003798 A1 | 1/2006 | Mizukami | ................... | 455/550.1 |
| 2006/0145660 A1 | 7/2006 | Black et al. | ................... | 320/108 |
| 2007/0057851 A1 | 3/2007 | Leizerovich et al. | ......... | 343/702 |
| 2008/0207282 A1 * | 8/2008 | Schaffler | .................... | 455/575.3 |

FOREIGN PATENT DOCUMENTS

WO    WO2005/069585 A1    7/2005

* cited by examiner

*Primary Examiner* — Duc M Nguyen
(74) *Attorney, Agent, or Firm* — Ware, Freesola, Van Der Sluys & Adolphson, LLP

(57) ABSTRACT

A short-range wireless power transmission scheme is used between two movably or detachably coupled device parts in an electronic device. In a device, such as a foldable or slidable mobile phone, both device parts have some electronic components that require electronic power but only one part has a power source. For example, a phone cover has a display but there is no power source in the phone cover. A receiver can be implemented in the cover to receive microwaves from a transmitter in the phone body. The receiver and the transmitter can be arranged such that, the antennas are placed as close to each other as possible in order to achieve best efficiency of energy and data transfer. If one pair of antenna is not enough, multiple antennas or antenna arrays can be used for this purpose. Different antenna pairs can be configurable for different purposes.

23 Claims, 8 Drawing Sheets

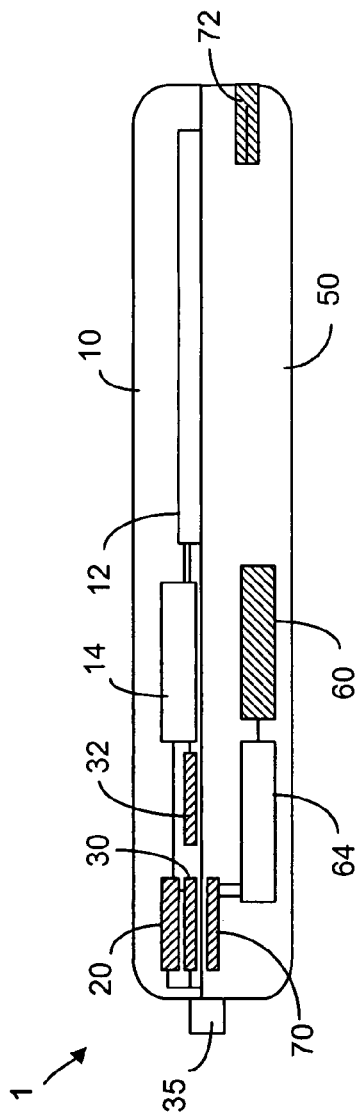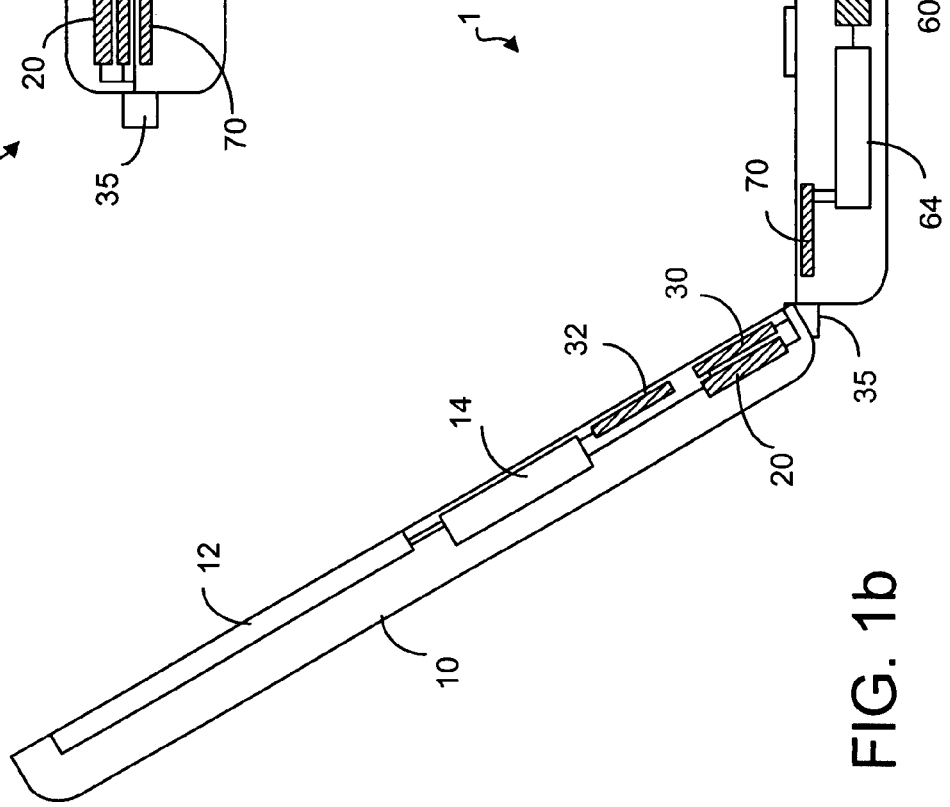

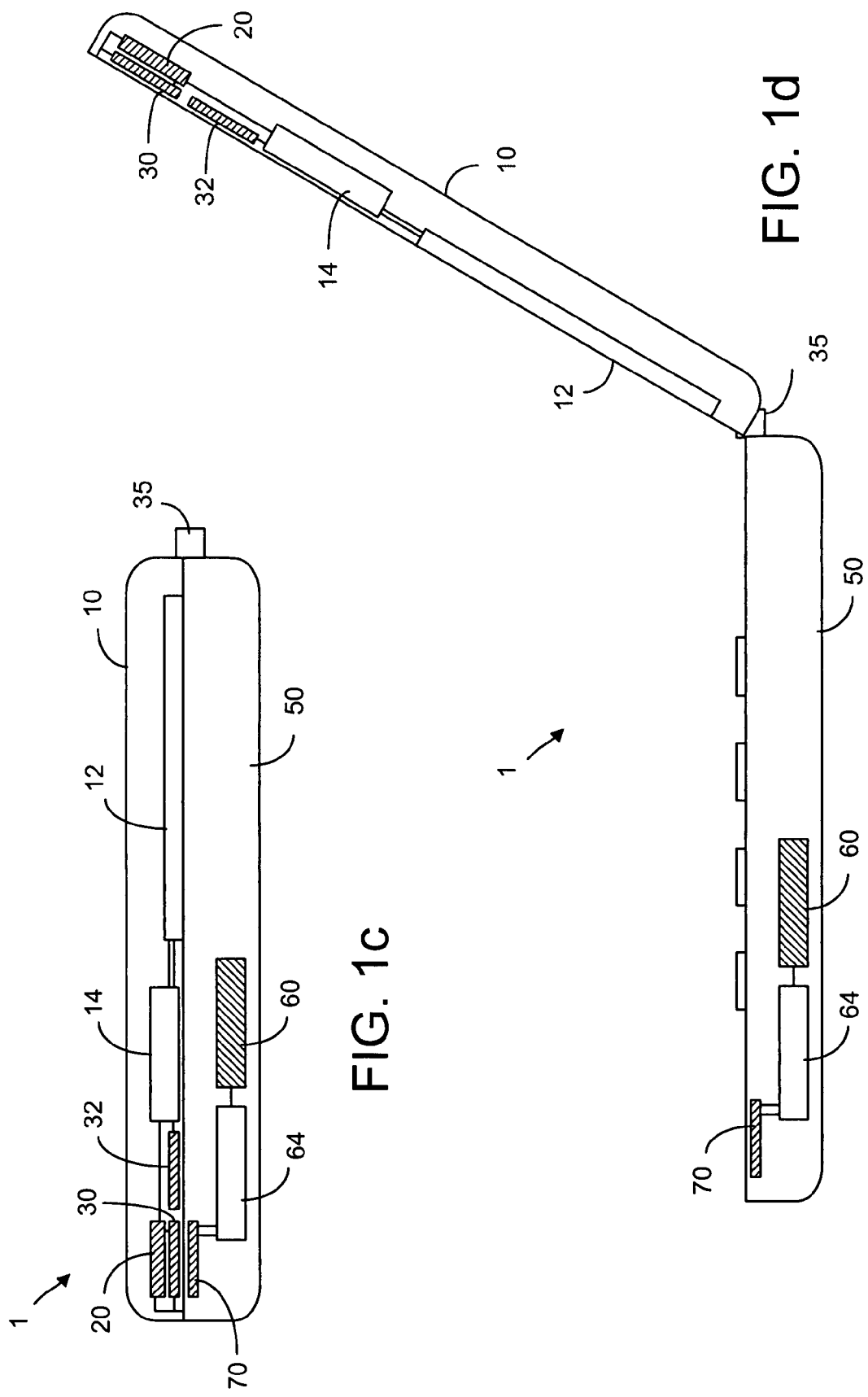

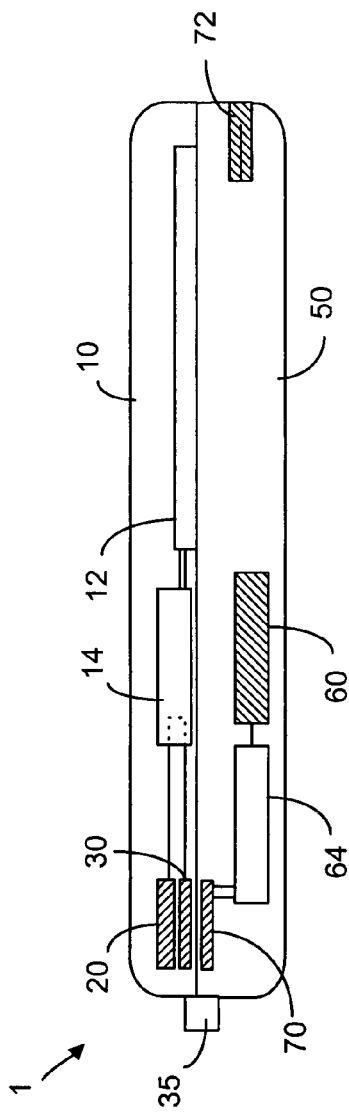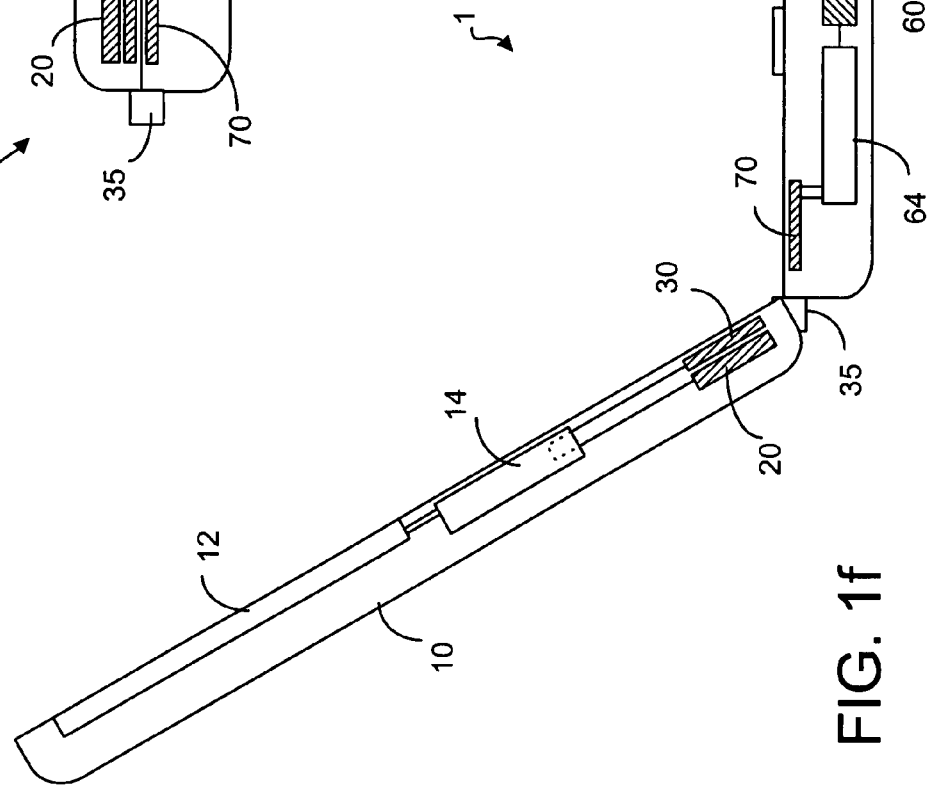

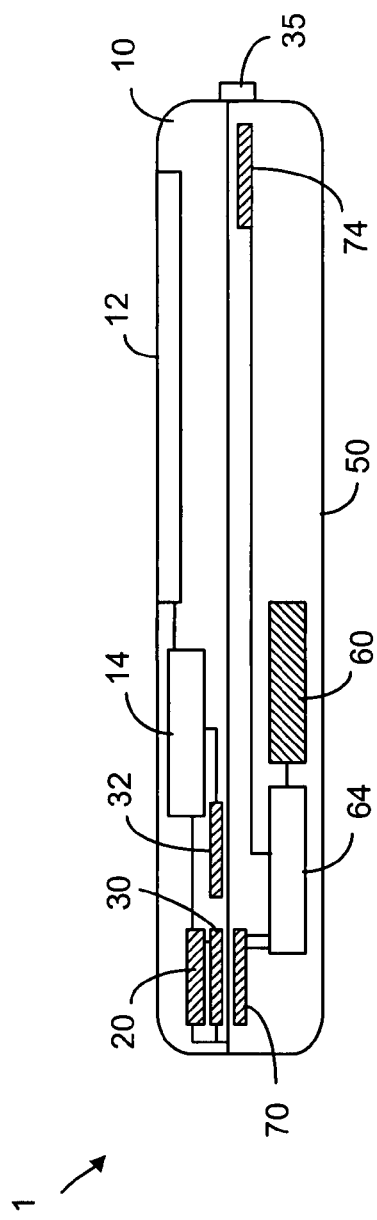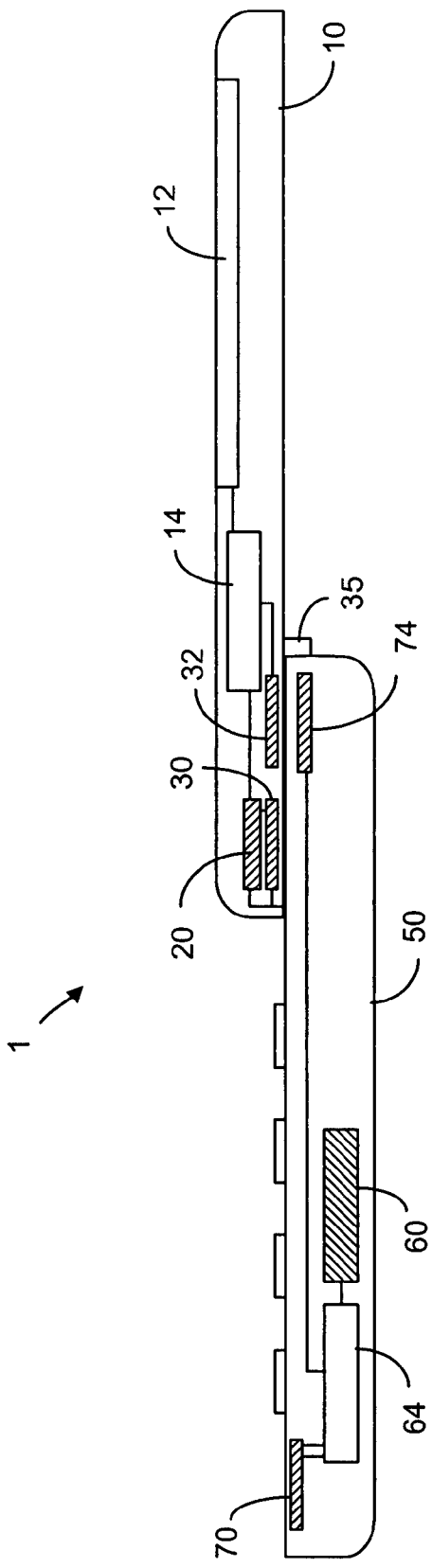

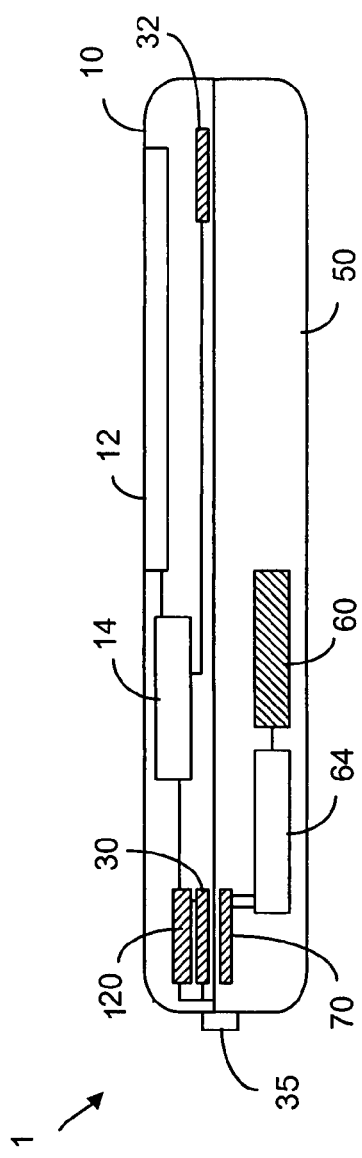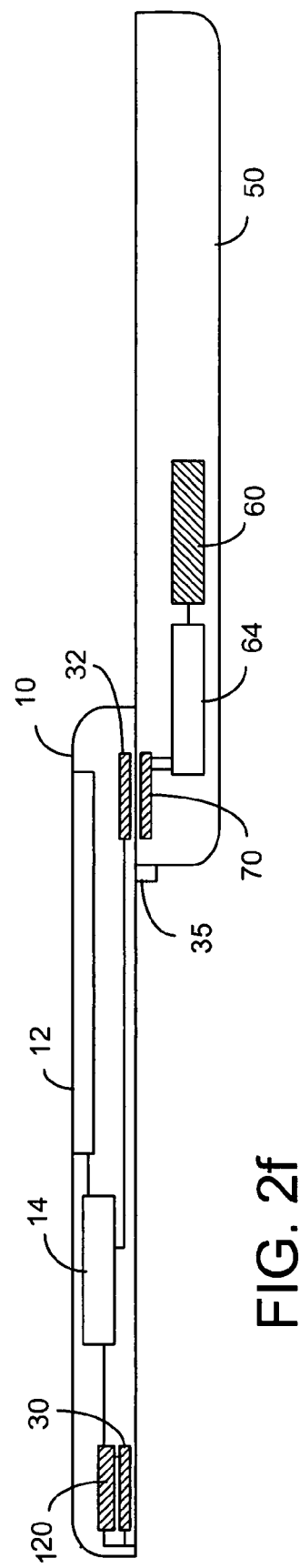

METHOD AND APPARATUS FOR TRANSFERRING ELECTRICAL POWER IN AN ELECTRONIC DEVICE

FIELD OF THE INVENTION

The present invention relates generally to a method and apparatus for transferring electrical power in an electronic device and, more particularly, to the transferring of electrical power in a device that has two or more movably connected device parts, and possibly one or more detachable parts.

BACKGROUND OF THE INVENTION

An electronic device, such as a mobile phone, may have two or more device parts movably connected to each other. If some or all movable parts of the device parts have one or more electronic components that need electrical power, but only one of the device parts has a battery or another type of power source, then electrical power must also be provided to the other device part.

It is desirable and advantageous to provide a method and apparatus for transferring electrical power from one device part to another.

SUMMARY OF THE INVENTION

The present invention is concerned with a short-range wireless power transmission between several moveable or detachable parts of an electronic device, which makes use of electromagnetic coupling, typically in the near field, at the microwave frequency. In an electronic device, such as a foldable or slidable mobile phone, both device parts have some electronic components that require electronic power but only one part has a power source. For example, a phone cover has a display but there is no power source in the phone cover. A receiver can be implemented in the cover to receive microwaves from a transmitter in the phone body. The receiver and the transmitter can be arranged such that, the antennas are placed as close to each other as possible in order to achieve best efficiency of energy and data transfer. If one pair of antenna is not enough, multiple antennas or antenna arrays can be used for this purpose. Different antenna pairs should be configurable for different purposes. According to one embodiment of the present invention, the phone cover has a separate antenna for receiving data from the transmitter in the phone body, for example.

Thus, the first aspect of the invention is a method for use in power transfer in an electronic device having a first device part mechanically coupled to a second device part. The method comprises:

providing a first electronic component in the first device; and providing a second electronic component in a second device part, wherein the electronic device is operable in a first configuration and in a second configuration, such that when the electronic device is operated in the first configuration, the second electronic component is configured for transmitting electromagnetic waves and the first electronic component is located adjacent to the second electronic component at a first distance for receiving the electromagnetic waves, and when the electronic device is operated in the second configuration, the first electronic component is spaced from the second electronic component at a second distance greater than the first distance.

The first electronic component may comprise one or more antennas.

The method further comprises:

providing a charge storage device in the first device part, wherein the charge storage device is electrically coupled to the first electronic component so as to allow the first electronic component to charge the charge storage device.

According to one embodiment of the present invention, when the electronic device is operated in the second configuration, the second electronic component is configured for transmitting data. The first device part further comprises an antenna for receiving the data. This antenna may be different and electrically separated from the first electronic component.

According to another embodiment of the present invention, the second device part has another antenna for transmitting data to the antenna in the first device part.

According to yet another embodiment, the second electronic component can also be configured for transmitting communication signals.

According to a different embodiment, communication signals are transmitted and received by a different antenna or pair of antennas.

According to a yet different embodiment, communication signals are transmitted and received by reusing the antenna pairs for electromagnetic wave transmission in the wireless power transfer scheme.

When the first electronic component is adjacent to the second electronic component, the power transferred from the second electronic component to the first electronic component can be carried out by microwave transmission, for example.

According to one embodiment of the present invention, the second electronic component comprises a multi-frequency antenna, wherein when the electronic device is operated in the first configuration, the multi-frequency antenna is configured for transmitting electromagnetic waves in a first frequency range; and when the electronic device is operated in the second configuration, the multi-frequency antenna is configured for transmitting and receiving communication signals in a second frequency range different from the first frequency range.

The first frequency range can be a millimeter-wave frequency range, and the second frequency range can be a microwave frequency range, for example.

The second aspect of the present invention is an apparatus, which comprises:

a first apparatus part comprising a first electronic component; and a second apparatus part mechanically coupled to the first apparatus part, the second apparatus comprising a second electronic component, wherein the apparatus is operable in a first configuration and in a second configuration, such that when the apparatus is operated in the first configuration, the second electronic component is configured for transmitting electromagnetic waves and the first electronic component is located adjacent to the second electronic component at a first distance for receiving the electromagnetic waves, and when the apparatus is operated in the second configuration, the second electronic component is spaced from the second electronic component at a second distance greater than the first distance.

The apparatus further comprises:

a charge storage device located in the first apparatus part, wherein the charge storage device is electrically coupled to the first electronic component so as to allow the first electronic component to charge the charge storage device.

According to one embodiment of the present invention, when the apparatus is operated in the second configuration, the second electronic component is configured for transmitting data. The data can be display data to be in a display panel in the first apparatus part, for example. The data can be received by a separate antenna in the first apparatus part in a wireless fashion or the same antenna in the first electronic component. Alternatively, the data is transmitted by a different transmitter in the second apparatus part.

In a different embodiment, data communications between the first apparatus part and the second apparatus part can also be carried when the apparatus is operated in the first configuration. Data communications can be carried out using the same antennas for wireless power transfer, or using different antennas.

The electronic device can be a foldable phone having a phone cover movably coupled to a phone body. The electronic device can also be a slidable phone or a phone having detachable parts. When the phone is operated in a closed position, a transmitter in the phone body can transfer electrical power to the phone cover via a receiver in the phone cover. When the phone is operated in an open position, the receiver may be located too far from the transmitter. In that case, the transmitter can be used to transfer data to the phone cover, for example.

The electronic device can be an MP3 player, a Communicator device, a personal digital assistance (PDA) or any electronic device that has two or more movably coupled device parts.

The present invention will become apparent upon reading the description taken in conjunction with FIGS. 1a to 7.

BRIEF DESCRIPTION OF THE DRAWINGS

FIG. 1a shows an electronic device having a first device part and a second device, wherein the device is in a closed position.

FIG. 1b shows the electronic device of FIG. 1a, wherein the first device part is turned at a hinge to open the device.

FIG. 1c shows an electronic device similar to that shown in FIG. 1a except that the hinge is located at a different end.

FIG. 1d shows the electronic device of FIG. 1c, wherein the first device part is turned at a hinge to open the device.

FIG. 1e shows an electronic device, according to another embodiment of the present invention.

FIG. 1f shows the electronic device of FIG. 1e, wherein the first device part is turned at a hinge to open the device.

FIG. 2a shows an electronic device, wherein the first device part is slidably connected to the second device part.

FIG. 2b shows the electronic device of FIG. 2a, wherein the first device part is slid against the second device part in order to open the device.

FIG. 2e shows an electronic device in a closed position, according to another embodiment of the present invention.

FIG. 2f shows the electronic device of FIG. 2e, wherein the first device part is slid against the second device part in order to open the device.

DETAILED DESCRIPTION OF THE INVENTION

Figure 2C:
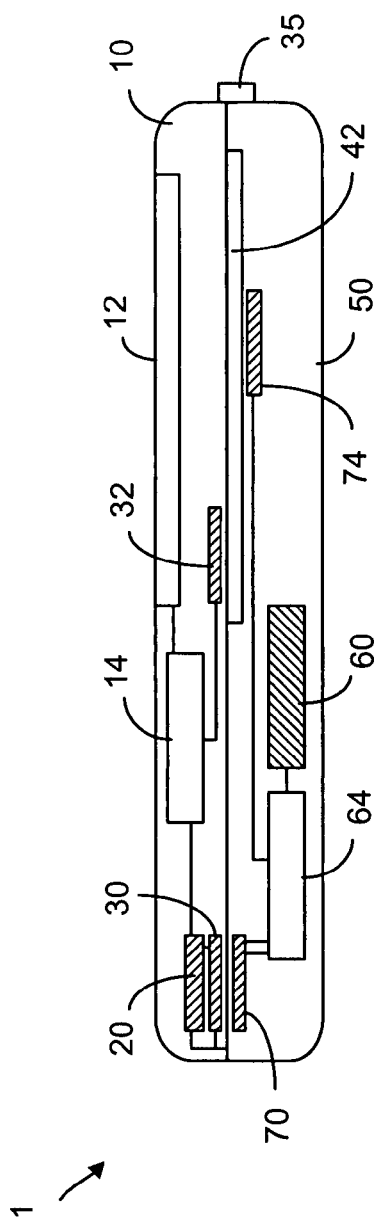
FIG. 2c shows an electronic device in a closed position, wherein the device has separable or detachable device parts.

In an electronic device that has several device parts movably connected to each other and some or all of the device parts have one or more electronic components that need electrical power, the present invention uses a wireless means for transferring electrical power from one device part to another.

As shown in FIG. 1a, an electronic device 1 has a first device part 10 and a second device part 50 movably connected to each other with a hinge 35. When the device 1 is in a closed position, the entire first device part is in close proximity to the second device part. As shown in FIG. 1a, the first device part 10 has a display 12, a processor 14 connected to a charge storage device 20, such as a rechargeable battery. The first device part 10 also has a charging device 30 coupled to the charge storage device 20 so that it can charge the charge storage device 20. The charge storage device 20 is used to provide electrical power to the processor 14 and the display 12. The processor 14 can be a display driver or the like. In various embodiments of the present invention, the charging device 30 is an electromagnetic signal receiver. According to one embodiment of the present invention, the first device part 10 has another antenna 32 for receiving display data, for example.

The second device part 50 has a power source, such as a battery 60, and a processor 64 connected to an electromagnetic signal transmitter 70. The transmitter 70 can be an antenna and the processor 64 can be used to control the transmission of electromagnetic signals by the transmitter 70, for example. When the electronic device 1 is in a closed position, as shown in FIG. 1a, the charging device 30 is located adjacent to the transmitter 70. As such, the charging device 30 can effectively receive the electromagnetic signals transmitted by the transmitter 70. The charging device 30 can also be an antenna. With the electrical energy received in a wireless fashion, the charging device 30 charges the charge storage device 20. The charging device 30 and the transmitter 70 can be two near-field communication (NFC) antennas, for example.

According to one embodiment of the present invention, when the device 1 is operated in an open position, the first device part 10 is turned away from the second device part 50 about the hinge 35. As shown in FIG. 1b, the charging device 30 is no longer located adjacent to the transmitter 70. As such, the charging operation in the first device part 10 becomes less effective, and the transmitter 70 can be configured for data communication, for example. In one embodiment of the present invention, the transmitter 70 is used to transmit display data to the antenna 32 to be used in the display 12, for example.

It should be noted that the charging device 30 can be an antenna, for example, for receiving electromagnetic signals from the transmitter 70. The antenna 30 is under the control of the processor 14 such that, when the device 1 is operated in the closed position (FIG. 1e), the antenna is configured for charging the charge storage device 20, and when the device 1 is operated in the open position (FIG. 1f), the antenna 30 is configured for receiving data from the transmitter 70 and providing the data to the display 12. As such, the data receiving antenna 32 can be eliminated.

The electronic device 1 can be a foldable mobile phone, for example. In one embodiment of the present invention, when the mobile phone is operated in an open position, as shown in FIG. 1b, the antenna 70 is used to send data to the display 12 via the antenna 32. In another embodiment, the device 1 has a different antenna 72 configured to transmit and receive data in communications signals under the control of the processor 64 when the mobile phone is operated in a closed position, as shown in FIG. 1a, or in the open position, as shown in FIG. 1b. Thus, the processor 64 can include a transceiver front-end having a duplexer, bandpass filters, amplifiers and other transceiver front-end components. The hinge 35 may comprise a switch which disables the charging function in the first device part when the mobile phone is operated in an open position.

In the embodiment as shown in FIGS. 1a and 1b, the antenna 30 and the antenna 70 are located near the hinge 35. In other embodiments, the antennas 30 and 70 can be located differently. For example, the antennas 30 and 70 can be located in a different end of the electronic device 1, as shown in FIGS. 1c and 1d. Moreover, the antennas 30 and 70 can be located in the front side, back side or the edge of both device parts, so long as they are located very close to each other in order to achieve a high efficiency in power transfer, when the device 1 is operated in the closed position.

When the device 1 is operated in the open position, the antenna 70 is configured to communicate with the antenna 32 in order to provide display data to the display 12, for example. In this embodiment, the antenna 70 can also be configured to communicate with an external device or network. In the external communication mode, the antenna 70 can be used to transmit and receive communication signals. The antenna 70 can be a multi-frequency antenna, configured to transmit microwave frequency signals for charging purposes, and to transmit and receive higher frequency signals for communication purposes, for example.

The electronic device can be arranged like a slidable mobile phone, for example. As shown in FIG. 2a, when the slidable mobile phone 1 is operated in a closed position, it is similar to the foldable mobile phone as shown in FIG. 1c, but the display 12 in the mobile phone 1 is located on a different side of the first device part 10. When the mobile phone is operated in an open position, the first device part 10 is slid against the second device part 50, as shown in FIG. 2b. As such, the charging device 30 is no longer adjacent to the transmitter 70. In the embodiment as shown in FIGS. 2a and 2b, it is possible to implement another antenna 74 on the other end of the second device part 50 for communicating with the antenna 32 in order to provide display data to the display 12. When the mobile phone 1 is operated in the closed position, as shown in FIG. 2a, the antenna 74 may be used for receiving communication signals, for example. When the device 1 is operated in the open position, as shown in FIG. 2b, the antenna 70 may be used for transmitting and receiving communication signals, for example.

Alternatively, the device 1 can be slid open in a different direction as shown in FIGS. 2e and 2f. In this embodiment, it is possible to locate the antenna 32 to be adjacent to the transmitter 70 for effective data communication when the mobile phone 1 is operated in the open position. As such, the antenna 74 is not necessary. In this open position, antenna 32 and antenna 70 can also be used for efficient power transmission, because they are so close to each other.

Figure 2D:
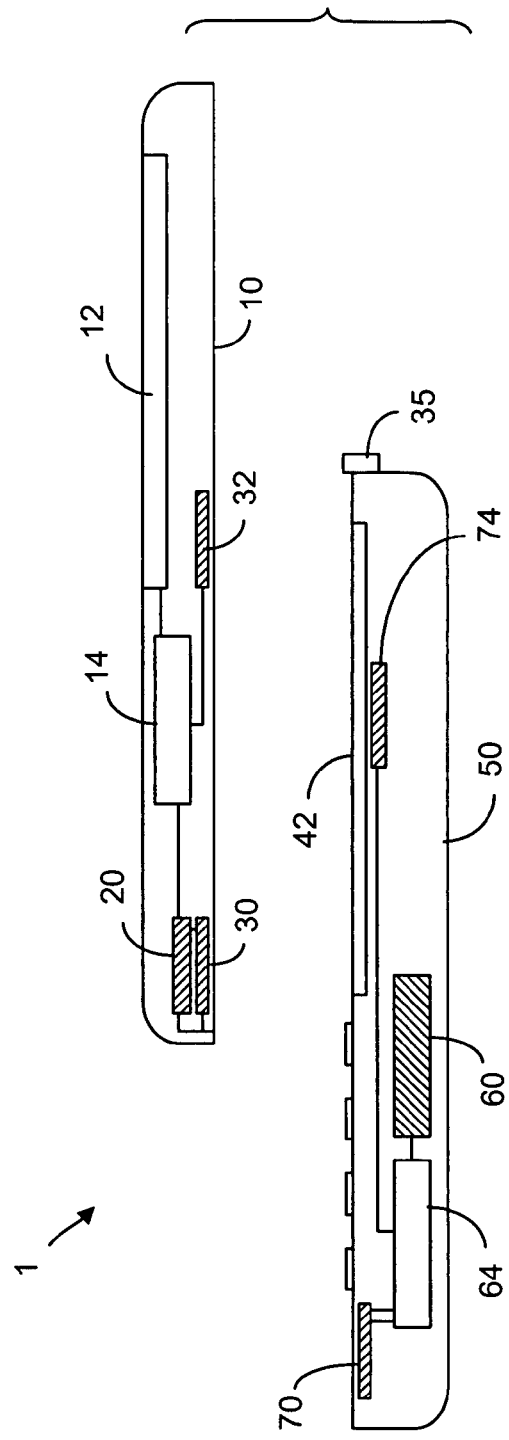
FIG. 2d shows the electronic device of FIG. 2c, wherein the one part is separated from another device part when the device is operated in an open position.

According to another embodiment of the present invention, the device 1 may have one or more detachable parts. For example, the device part 10 can be separated from the device part 50, as shown in FIG. 2d. As shown in FIGS. 2c and 2d, the device part 50 also has a display 42 so that the device part 50 can be used as a stand-alone communication device, for example. As in the embodiment as shown in FIG. 2a, when the device 1 is operated in the closed position, the antenna 70 is used mainly to charge the charge storage device 20 by transmitting electromagnetic waves to the charging device 30, and the antenna 74 can be used to provide display data to the display 12 by communicating with the antenna 32. When the device 1 is operated in the open position, the antenna 32 may or may not receive display data from the antenna 74, depending on the separation distance. The antenna 70 may be used for transmitting and receiving communication signals.

Figure 3B:
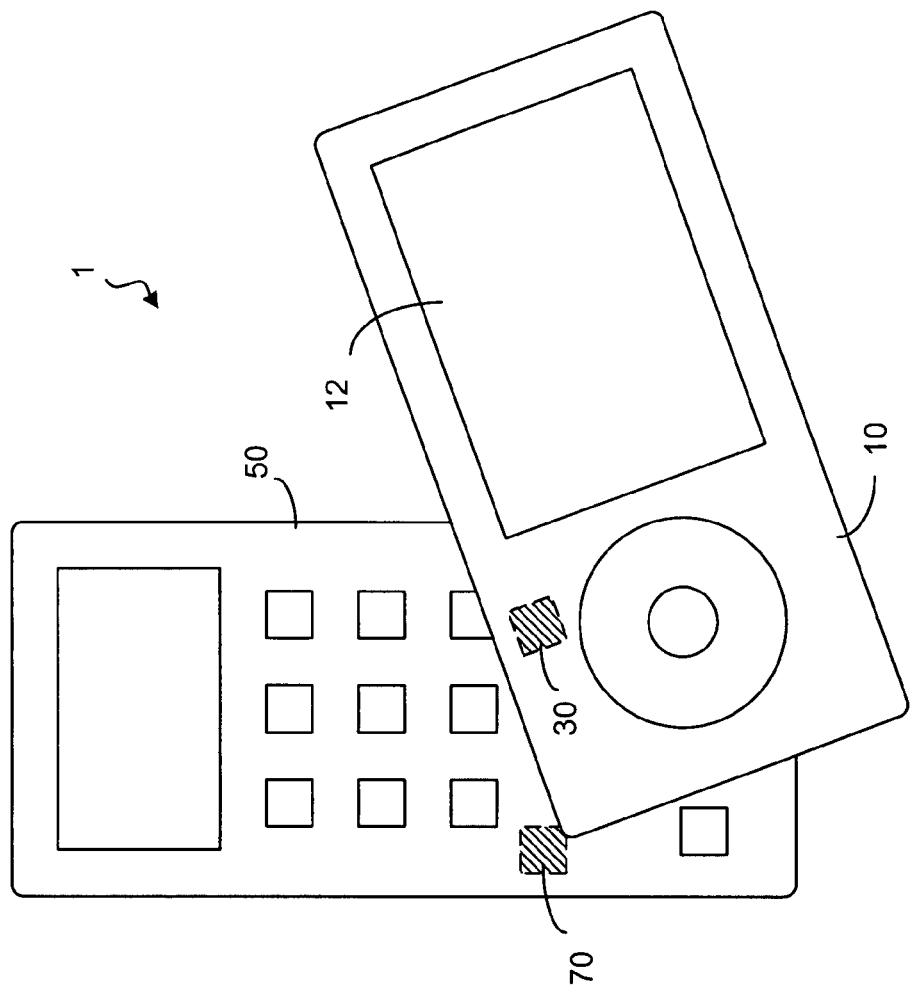
FIG. 3b shows the electronic device of FIG. 3a, wherein the first device part is rotated against the second device part in order to open the device.
Figure 3A:
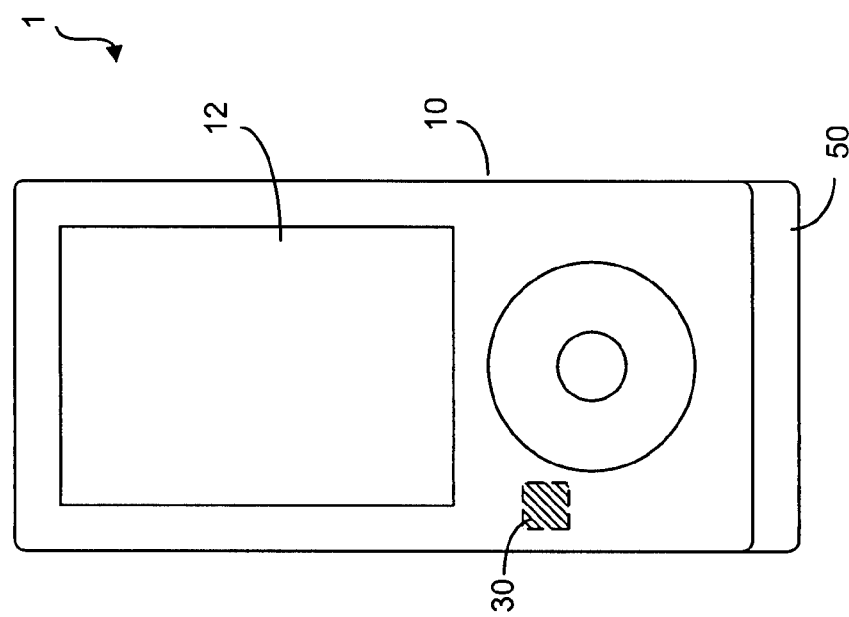
FIG. 3a shows another electronic device having a first device and a second device part.

The electronic device can also be arranged so that the first device part 10 can be rotated against the second device part 50 as shown in FIGS. 3a and 3b. As shown in FIG. 3b, when the device 1 is operated in an open position, the charging device 30 is no longer adjacent to the transmitter 70.

It should be noted that, in one embodiment of the present invention, the electromagnetic signal receiver 30 is a passive device, such as a radio frequency identification (RFID) tag, for example.

Figure 7:
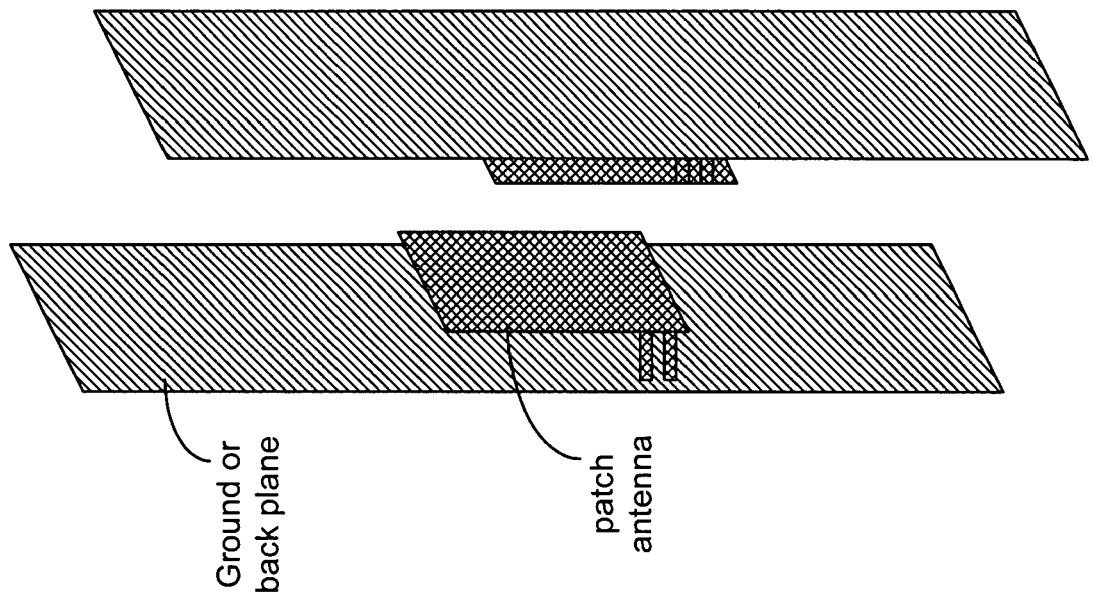
FIG. 7 shows an antenna for transmitting and/or receiving electromagnetic signals, according to a different embodiment of the present invention.
Figure 6:
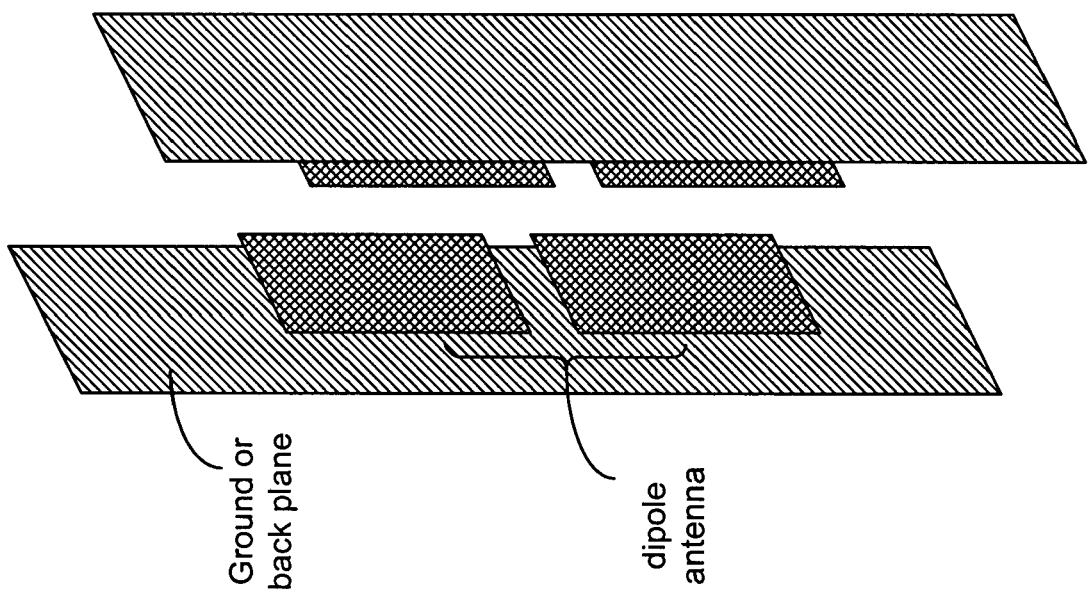
FIG. 6 shows an antenna for transmitting and/or receiving electromagnetic signals, according to yet another embodiment of the present invention.
Figure 4:
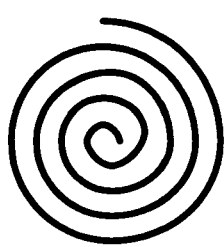
FIG. 4 shows an antenna for transmitting and/or receiving electromagnetic signals, according to one embodiment of the present invention.
Figure 5:
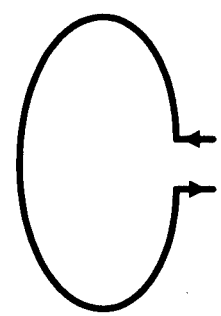
FIG. 5 shows an antenna for transmitting and/or receiving electromagnetic signals, according to another embodiment of the present invention.

The electromagnetic signal transmitter 70 and the electromagnetic signal receiver 30 can be of the same design or of different designs. For example, both the transmitter 70 and the receiver 30 can be a spiral antenna as shown in FIG. 4; a loop antenna as shown in FIG. 5; a dipole antenna as shown in FIG. 6, or a patch antenna as shown in FIG. 7. In some or all of these antennas, there may be a ground plane or a back plane located adjacent to the antenna. The antennas can be operated in the 60 GHz Ultra Wide Band (UWB) radio frequency range, for example. With the wavelength of the radio signals being in the millimeter range, the antennas can be sufficiently small to fit in a small electronic device. The antenna ground plane can be as small as 5 mm-by-5 mm, for example.

In an arrangement such as that shown in FIG. 6, the back plane can be a quarter of a wavelength apart from the dipole, for example. In an arrangement such as that shown in FIG. 7, the distance between the two patch antennas can be between 0.2 to 10 mm when the operating frequency is 65 GHz or 60 GHz, for example. The longer dimension of the patches can be 6 mm, for example, and the short dimension is about 2 mm, for example. It should be noted that distance between the transmitting antenna 70 and the receiving antenna 20 varies with the shape, the size of the antennas and the operating frequencies. Nevertheless, the principle of using two near-field communication antennas placed at close proximity for the transfer of electrical power is the same regardless of the choice and the design of the antennas. The choice and the design of the antennas may affect the power transfer efficiency.

In sum, the present invention provides a method for wireless power transfer between two or more movably or detachably connected device parts. The power transfer can be carried out by transmitting and receiving electromagnetic signals in the microwave frequency, for example. In an electronic device having a first part mechanically coupled to the second device part and the device operable in a first and a second configuration, the power and data transferring method comprises:

providing a first electronic component in the first device part, and providing a second electronic component in the second device part of the electronic device, wherein the first device part is mechanically coupled to the second device part, such that when the electronic device is operated in the first configuration, the second electronic component is configured for transmitting electromagnetic waves and the first electronic component is located adjacent to the second electronic component at a first distance for receiving the electromagnetic waves, and when the electronic device is operated in the second configuration, the first electronic component is spaced from the second electronic component at a second distance greater than the first distance, the electronic device is operated in the second configuration, the second electronic component is configured for transmitting data.

The data can be received by a separate antenna in the first apparatus part in a wireless fashion or the same antenna in the first electronic component. Alternatively, the data is transmitted by a different transmitter in the second apparatus part. In a different embodiment, data communications between the first apparatus part and the second apparatus part can also be carried when the apparatus is operated in the first configuration. Data communications can be carried out using the same antennas for wireless power transfer, or using different antennas.

The method further comprises:
providing a charge storage device in the first device part, wherein the charge storage device is electrically coupled to the first electronic component so as to allow the first electronic component to charge the charge storage device.

The method further comprises:
providing a third electronic component in the first device part for receiving the data from the second electronic component, and a fourth electronic component in the second device part for transmitting data to the third electronic component.

providing a third electronic component in the first device part for receiving the data from the second electronic component, and reusing the second component in the second device part for transmitting data to the third electronic component.

In one embodiment of the present invention, when the electronic device is operated in the second configuration, the second electronic component is configured for transmitting communication signals. In one embodiment of the present invention, when the electronic device is operated in the second configuration, the second electronic component can still be configured for transmitting power only if the transmit and receive antennas are close enough, like in FIGS. 2e and 2f. In another embodiment of the present invention, communication signals are transmitted and received by a different antenna or electronic component.

According to one embodiment of the present invention, the second electronic component can be a multi-frequency antenna, such that when the electronic device is operated in the first configuration, the multi-frequency antenna is configured for transmitting electromagnetic waves in a millimeter-wave frequency range, for example; and when the electronic device is operated in the second configuration, the multi-frequency antenna is configured for transmitting and receiving communication signals in a microwave frequency range, for example.

In a different embodiment of the present invention, when the electronic device is operated in the first configuration, the multi-frequency antenna is configured for transmitting electromagnetic waves in a microwave frequency range, for example; and when the electronic device is operated in the second configuration, the multi-frequency antenna is configured for transmitting and receiving communication signals in a radio frequency range, for example.

The present invention also provides an apparatus having a first apparatus part mechanically coupled to a second apparatus part, the apparatus operable in a first configuration and a second configuration. The apparatus comprises:

a first electronic component located in the first apparatus part; and a second electronic component located in the second apparatus part, such that when the apparatus is operated in the first configuration, the second electronic component is configured for transmitting electromagnetic waves and the first electronic component is located adjacent to the second electronic component at a first distance for receiving the electromagnetic waves, and when the apparatus is operated in the second configuration, the second electronic component is spaced from the second electronic component at a second distance greater than the first distance, and the second electronic component can be configured for transmitting data.

The apparatus further comprises:
a charge storage device located in the first apparatus part, wherein the charge storage device is electrically coupled to the first electronic component so as to allow the first electronic component to charge the charge storage device.

In one embodiment of the present invention, the apparatus further comprises:
a third electronic component located in the first apparatus part for receiving the data in wirelessly from the second electronic component.

In another embodiment of the present invention, a fourth electronic component located in the second apparatus part can be used for transmitting data to the third electronic component.

In yet another embodiment, apparatus further comprises:
a third antenna for transmitting and receiving communication signals.

In a different embodiment, the second electronic component comprises a multi-frequency antenna, wherein when the apparatus is operated in the first configuration, the multi-frequency antenna is configured for transmitting electromagnetic waves in a microwave range; and when the apparatus is operated in the second configuration, the multi-frequency antenna is configured for transmitting and receiving communication signals in a radio frequency range.

The apparatus, according various embodiments of the present invention, can be a mobile phone, for example. The mobile phone has a display located in the first apparatus part, wherein the charge storage device is operatively coupled to the display for providing electrical power to the display; and a third electronic component located in the first apparatus part, configured for wirelessly receiving the data, wherein the third electronic component is operatively coupled to the display for providing the data to the display.

The mobile phone can be a foldable phone, a slidable phone or a phone that has separable parts.

In general, the present invention provides an apparatus operable in a first configuration and in a second configuration.

The apparatus comprises:
a first apparatus part;
a second apparatus part mechanically coupled to the first apparatus part;
a charge storage device located in the first apparatus part;
an electronic component located in the first apparatus part, electrically coupled to the charge storage device;
a receiver located in the first apparatus part, electrically coupled to the charge storage device;
a transmitter located in the second apparatus part, wherein
when the apparatus is operated in the first configuration, the transmitter is configured for transmitting electromagnetic waves and the receiver is located adjacent to the transmitter at a first distance for receiving the electromagnetic waves for charging the charge storage device; and
when the apparatus is operated in the second configuration, the receiver is located spaced from the transmitter at a second distance greater than the first distance, and the transmitter is configured for transmitting data in order to provide the data to the electronic component in the second apparatus component in a wireless fashion. When the
electromagnetic signal transmitter is located at a second distance greater than the first distance, the electromagnetic signal transmitter can be used for data communications, for example.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A method comprising:
providing a first electronic component in a first device part of an electronic device; and
providing a second electronic component in a second device part of the electronic device, the second electronic component comprising a multi-frequency antenna, wherein the first device part is mechanically coupled to the second device part, and the electronic device is operable in a first configuration and in a second configuration, such that
when the electronic device is operated in the first configuration, the multi-frequency antenna is configured to transmit electromagnetic waves in a first frequency range and the first electronic component is located adjacent to the second electronic component at a first distance for receiving the electromagnetic waves, and
when the electronic device is operated in the second configuration, the first electronic component is spaced from the second electronic component at a second distance greater than the first distance, and the multi-frequency antenna is configured to transmit and receive communication signals in a second frequency range different from the first frequency range.

2. The method of claim 1, further comprising:
providing a charge storage device in the first device part, wherein the charge storage device is electrically coupled to the first electronic component so as to allow the first electronic component to charge the charge storage device.

3. The method of claim 1, wherein when the electronic device is operated in the second configuration, the second electronic component is configured for transmitting data.

4. The method of claim 3, further comprising:
providing a third electronic component in the first device part for receiving the data in a wireless fashion.

5. The method of claim 3, wherein the first electronic component comprises a first antenna, and the second electronic component comprises a second antenna, said method further comprising:
providing a third antenna in the electronic device for transmitting and receiving communication signals.

6. The method of claim 1, further comprising:
providing a third electronic component in the first device part; and
providing a fourth electronic component in the second device part for transmitting data to the third electronic component in a wireless fashion.

7. The method of claim 1, wherein when the electronic device is operated in the second configuration, the second electronic component is configured for transmitting and receiving communication signals to another electronic device.

8. The method of claim 1, wherein the first frequency range is in a millimeter-wave frequency range and the second frequency range is in a microwave frequency range.

9. The method of claim 1, wherein the first electronic component comprises a radio-frequency identification device.

10. An apparatus comprising:
a first apparatus part comprising a first electronic component; and
a second apparatus part mechanically coupled to the first apparatus part, the second apparatus part comprising a second electronic component, the second electronic component comprising a multi-frequency antenna, wherein the apparatus is operable in a first configuration and in a second configuration, such that
when the apparatus is operated in the first configuration, the multi-frequency antenna is configured to transmit electromagnetic waves in a first frequency range and the first electronic component is located adjacent to the second electronic component at a first distance for receiving the electromagnetic waves, and
when the apparatus is operated in the second configuration, the first electronic component is spaced from the second electronic component at a second distance greater than the first distance, and the multi-frequency antenna is configured to transmit and receive communication signals in a second frequency range different from the first frequency range.

11. The apparatus of claim 10, further comprising:
a charge storage device located in the first apparatus part, wherein the charge storage device is electrically coupled to the first electronic component so as to allow the first electronic component to charge the charge storage device.

12. The apparatus of claim 11, when the apparatus is operated in the second configuration, the second electronic component is configured for transmitting data, said apparatus further comprising:
an electronic module located in the first apparatus part, electrically coupled to the charge storage device for receiving electrical power from the charge storage device; and
a third electronic component located in the first apparatus part, configured for wirelessly receiving the data, wherein the third electronic component is operatively coupled to the electronic module for providing the data to the electronic module.

13. The apparatus of claim 11, further comprising:
a display located in the first apparatus part electrically coupled to the charge storage device for receiving electrical power from the charge storage device;
a third electronic component located in the second apparatus part, the third electronic component configured for transmitting data; and
a fourth electronic component located in the first apparatus part, electrically coupled to the display, wherein the fourth electronic component is configured for wirelessly receiving the data for providing the data to the display.

14. The apparatus of claim 10, wherein when the apparatus is operated in the second configuration, the second electronic component is configured for transmitting data.

15. The apparatus of claim 14, further comprising:
a third electronic component located in the first apparatus part for receiving the data in a wireless fashion.

16. The apparatus of claim 14, wherein when the apparatus is operated in the second configuration, the first electronic component is configured for receiving the data.

17. The apparatus of claim 10, wherein the first electronic component comprises a first antenna, and the second electronic component comprises a second antenna, said apparatus further comprising:
a third antenna for transmitting and receiving communication signals.

18. The apparatus of claim 10, wherein the first frequency range is in a microwave frequency range and the second frequency range is in a radio frequency range.

19. The apparatus of claim 10, wherein the first apparatus part has a first end and an opposing second end, the first apparatus end rotatably connected to the second apparatus part, the second apparatus part having a surface, wherein when the apparatus is operated in the first configuration, both the first end and the second end of the first apparatus are located adjacent to the surface of the second apparatus, and when the apparatus is operated in the second configuration, the second end of the first apparatus is spaced from the surface of the second apparatus part.

20. The apparatus of claim 19, wherein the first electronic component is located near the first end or the second end of the first apparatus part.

21. The apparatus of claim 10, comprising a mobile terminal.

22. The apparatus of claim 10, wherein the first apparatus part has an end section and the second apparatus part has a first end and an opposing second end, the first apparatus part slidably coupled to the second apparatus part, and wherein when the apparatus is operated in the first configuration, the end section of the first apparatus part is located adjacent to the first end of the second apparatus part, and when the apparatus is operated in the second configuration, the end section of the first apparatus part is located away from the first end of the second apparatus part toward the second end of the second apparatus part.

23. An apparatus operable in a first configuration and in a second configuration, said apparatus comprising:
a first apparatus part mechanically coupled to a second apparatus part;
an electronic module located in the first apparatus part;
a charge storage device located in the first apparatus part, electrically coupled to the electronic module for providing electrical power to the electronic module;
a receiver (30) located in the first apparatus part, electrically coupled to the charge storage device; and
a multi-frequency antenna located in the second apparatus part, wherein
when the apparatus is operated in the first configuration, the multi-frequency antenna is configured to transmit electromagnetic waves in the first frequency range and the receiver is located adjacent to the multi-frequency antenna at a first distance for receiving the electromagnetic waves for charging the charge storage device; and
when the apparatus is operated in the second configuration, the receiver is located spaced from the multi-frequency antenna at a second distance greater than the first distance, and the multi-frequency antenna is configured to transmit data in a second frequency range different from the first frequency range for providing the data to the electronic module in a wireless fashion.

* * * * *